Patented Apr. 22, 1924.

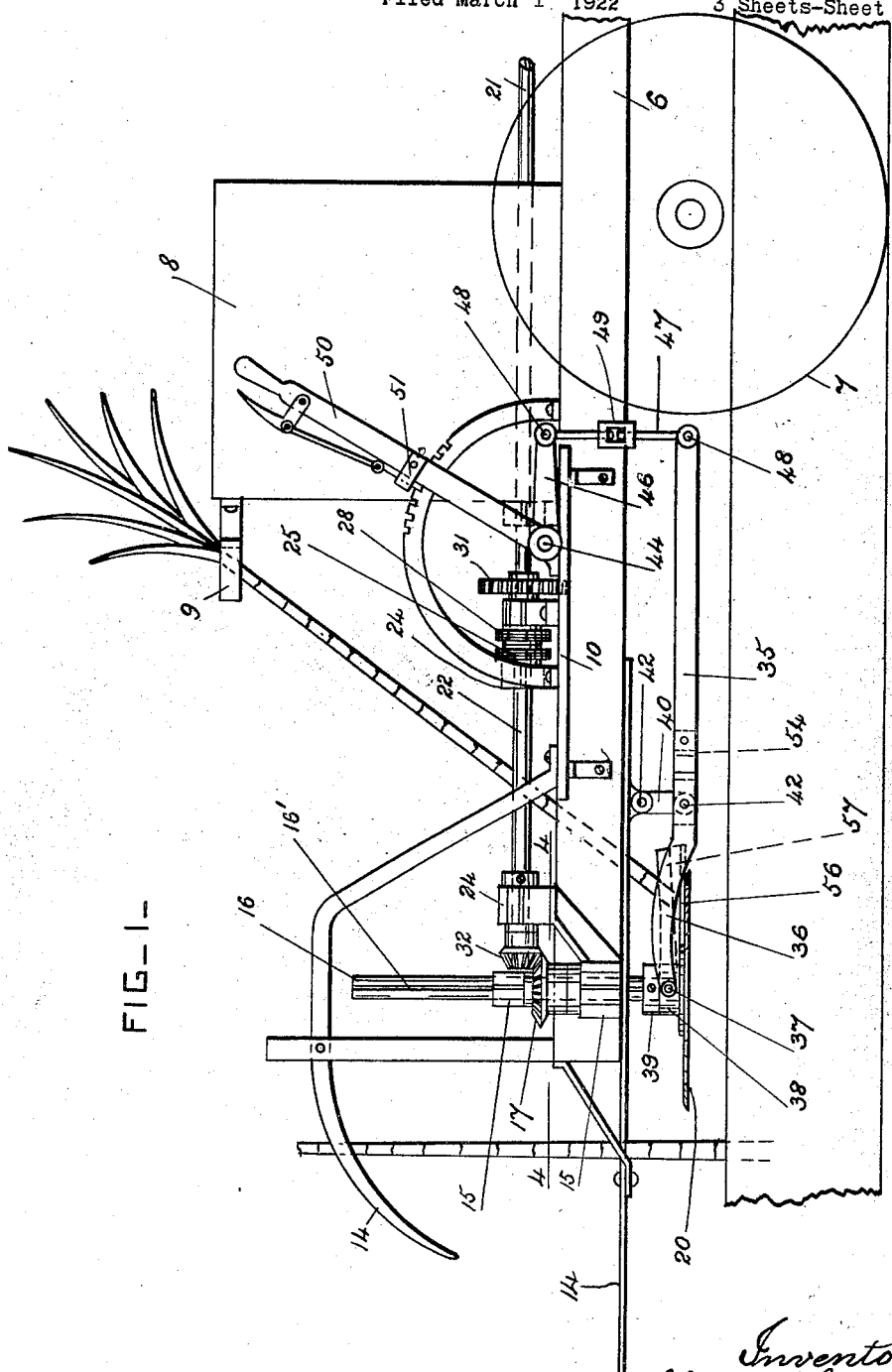

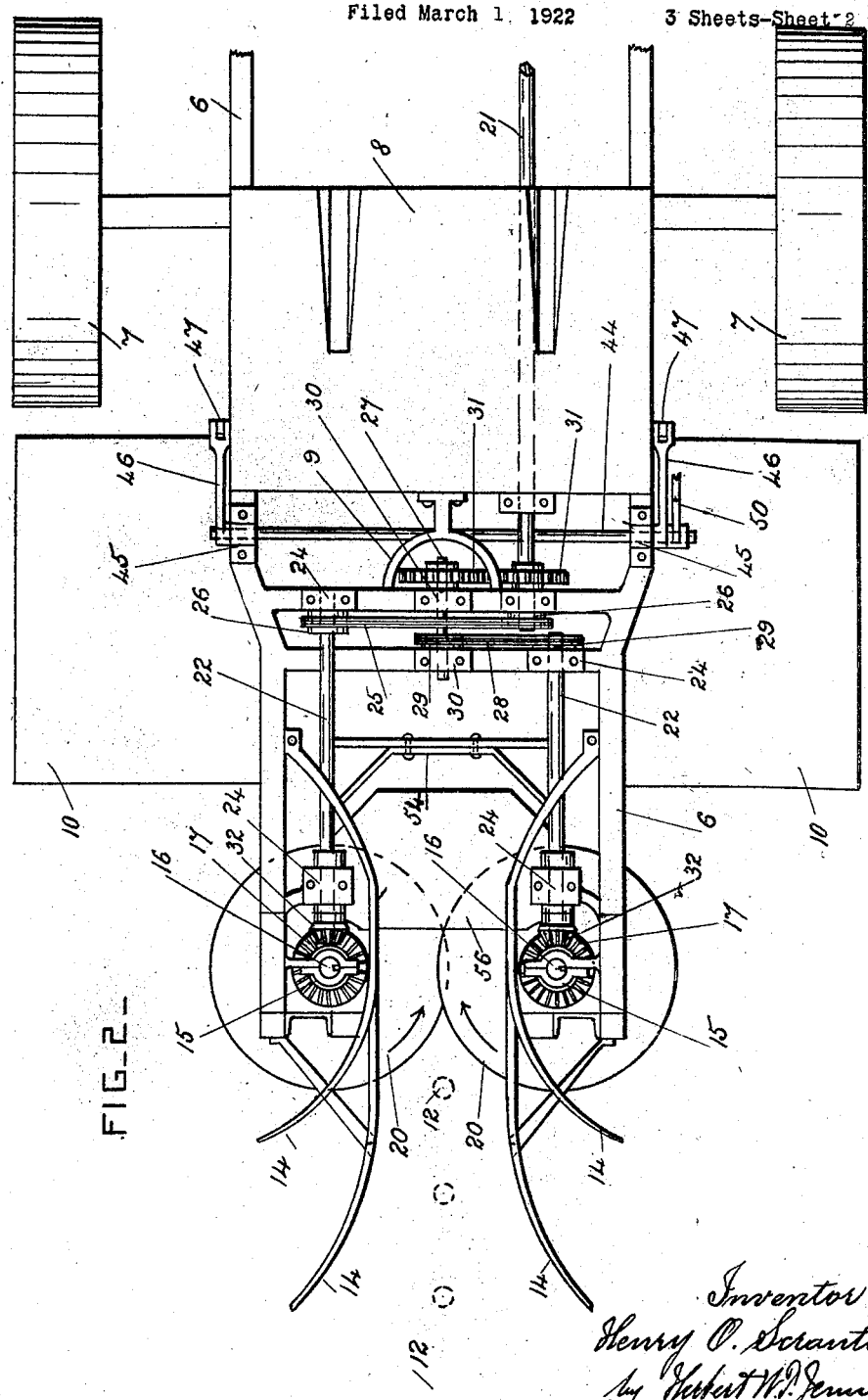

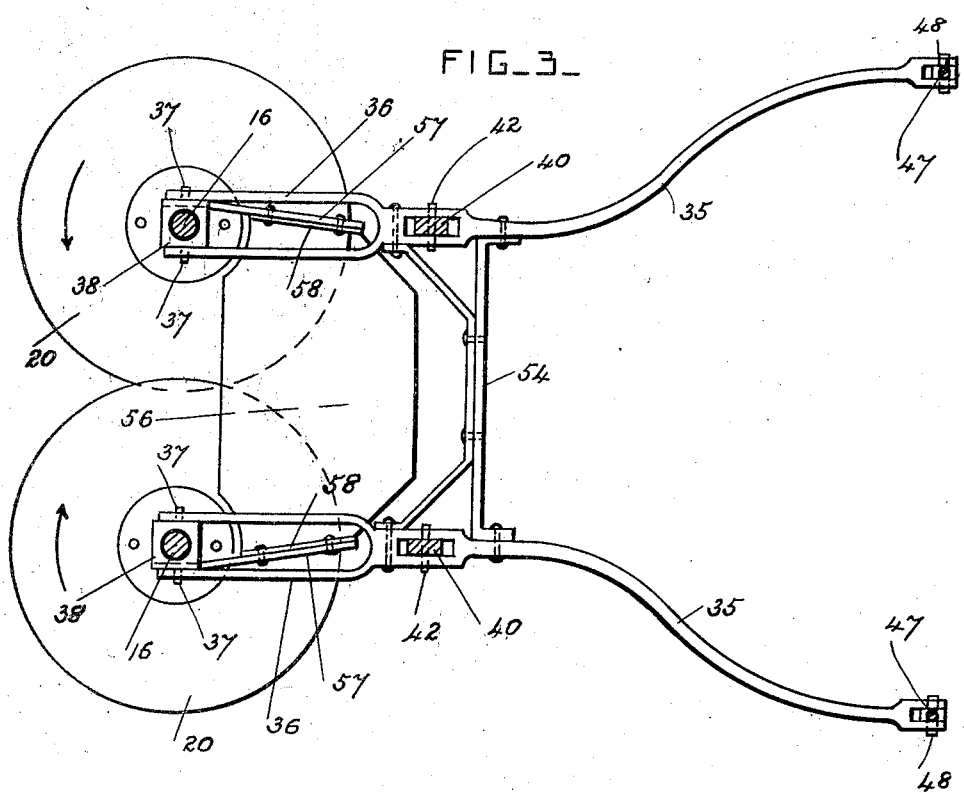
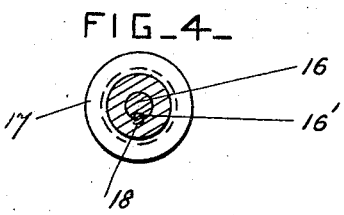

1,491,069

UNITED STATES PATENT OFFICE.

HENRY O. SCRANTON, OF JEANERETTE, LOUISIANA.

CANE-HARVESTING MACHINE.

Application filed March 1, 1922. Serial No. 540,261.

*To all whom it may concern:*

Be it known that I, HENRY O. SCRANTON, a citizen of the United States, residing at Jeanerette, in the parish of Iberia and State of Louisiana, have invented certain new and useful Improvements in Cane-Harvesting Machines, of which the following is a specification.

This invention relates to harvesters specially adapted for cutting down sugar canes, but which may be used for other plants; and it consists in the novel construction and combination of the parts hereinafter fully described and claimed whereby the canes are cut down as the machine is moved along the ground and are supported in an inclined position so that they may be fed to the topping and stripping devices with facility.

In the drawings, Figure 1 is a side view of the front end portion of a cane harvester constructed according to this invention. Fig. 2 is a plan view of the same. Fig. 3 is a detail plan view of the cutters, the plate which supports the canes, and the front end portions of the levers which support and adjust the said cutters and plate. Fig. 4 is a cross-section through one of the cutter shafts, taken on the line 4—4 in Fig. 1.

The machine is provided with a frame 6, which is mounted on front ground wheels 7. A portion of a table 8 is shown secured to the frame, and this table is adapted to support the canes while being topped. A rack or bracket 9 is secured to the middle part of the front end of the table top, for the cut canes to rest against as shown in Fig. 1. The men who attend to the topping and stripping, stand on platforms 10 at the sides of the frame a little in advance of the table. The canes grow in rows, and are indicated by the circles 12 in Fig. 2. The front end portion of the frame has curved guide arms 14 secured to it. These arms operate to straighten up the canes, and guide them to the cutting blades, and are of any approved form.

Bearings 15 are secured to the frame at the sides of the machine, and 16 are vertical cutter shafts journaled in the bearings 15, and provided with longitudinal keyways 16'. Two similar bearings 15 are provided at each side of the machine. Bevel toothed wheels or gears 17 are arranged between the pairs of bearings, and have keys 18 secured in their hubs and slidable in the key-ways 16'. The two bearings of each pair are arranged one above the other, and the beveled toothed wheels 17, which are the driving wheels for the shafts 16, are arranged one on a shaft and each between a pair of bearings.

Circular cutters 20 are secured on the lower ends of the shafts 16, and overlap each other on the center line of draft of the machine, and form a pair of circular shears. These cutters are revolved in opposite directions, as indicated by the curved arrows adjacent to them on the drawings.

The cutter shafts 16 are driven from a main driving shaft 21, which is actuated by any suitable motor. Longitudinal countershafts 22 are provided, and are arranged one at each side of the machine, and are journaled in bearings 24 on the frame. One of these countershafts is driven from the main shaft 21 by a drive chain 25 and sprocket wheels 26. The other countershaft is driven from a reversing shaft 27 by means of a drive chain 28 and sprocket wheels 29. The reversing shaft 27 is journaled in bearings 30 on the frame, and is driven from the main shaft 21 by intergearing toothed wheels or gears 31. Beveled toothed wheels 32 are secured on the front end portions of the countershafts 22, and gear into the bevel toothed wheels or gears 17. Any other approved driving mechanism can however be used for revolving the cutters or shears continuously in opposite directions.

The cutters are raised and lowered to adjust their height with relation to the ground on which the ground wheels run, by means of similar levers 35. Each lever 35 has a forked front end portion 36 which is pivoted by pins 37 to a rectangular block 38. This block is arranged loosely on the shaft 16 between the hub of the cutter, which is secured to the shaft, and a collar 39 which is also secured to the shaft. Each lever 35 is suspended from the frame by a link 40 and pivot pins 42. The rear end portions of the levers 35 are connected to a rock-shaft 44, by means of arms 46 and links 47. The rock-shaft is journaled in bearings 45, and is arranged crosswise of the frame. The arms 46 are secured on the end portions of the rock-shaft, and are connected with the levers 35 by the links 47 which have pins 48. The links 47 are preferably adjustable in length, and are provided with screw-threaded portions arranged right and left and connected by turnbuckles 49. An operating lever 50 is also secured to the rock-shaft at one side of the machine, and is held in place by any suitable catch mechanism 51. The rear end portions of the levers 35 are inclined or curved outwardly in opposite directions, and are secured together near their pivoted suspension links 40 by a suitable brace or braces 54.

A plate 56 for supporting the lower ends of the cut canes is supported by the levers 35 directly over the rear parts of the pair of circular cutters. This plate is preferably secured to two arms 57 which are rigidly secured to the rectangular blocks 38, and work in the forked end portions of the levers.

These arms 57 converge a little, and the plate 56 has upwardly projecting side flanges 58 which are secured to the arms. The canes are cut down by the pair of revolving shears as the machine is moved along. The lower ends of the canes are carried, by the blades and by their own inertia, onto the plate 56 which is pushed forwardly under them so that it supports them, and their upper end portions fall rearwardly onto the rack or bracket 9, as shown in Fig. 1. The guide arms prevent the canes from falling over laterally, and when cut the canes are within the reach of the men on the platforms.

The link supports of the levers 35 enable the cutter shafts to be slid up and down without binding, and almost instantaneously, which is very necessary in a machine of this sort, as cane fields are rough and uneven places. The shears do not require to be driven at a high speed, and the machine works without vibration. The various shaft bearings are preferably provided with antifriction devices of approved sort to enable the mechanism to work freely.

The turnbuckles of the adjustable links 47 enable the circular shears to be held in one horizontal plane by the catch of the operating lever, so that they make a clean cut, and have no slack which would make them move up and down while cutting, or would make them move apart from each other, in a disadvantageous manner.

What I claim is:

1. In a harvester, a supporting frame, two vertical driving shafts journaled in the frame, cutters revolving with the said shafts and forming a pair of shears, two similar levers pivoted between their ends and supported by the frame and arranged one at each side of it, means for raising and lowering the cutters connected to the front ends of the levers, and means for operating the levers simultaneously by hand connected to their rear ends.

2. In a harvester, a supporting frame, two vertical driving shafts journaled in the frame, cutters revolving with the said shafts and forming a pair of shears, links pivoted at their upper ends to the frame and free to rock longitudinally of it, two similar levers pivoted between their ends to the lower end portions of the said links, means for raising and lowering the cutters connected to the front ends of the levers, and means for operating the levers simultaneously connected to their rear ends.

3. In a harvester, a supporting frame, levers pivoted in the said frame, non-revoluble blocks pivoted to the said levers, a pair of circular shears operatively connected with the said blocks, said shears being adjustable vertically by the said levers and blocks, means for revolving the shears, arms secured to the said blocks, and a plate for supporting the lower ends of the cut plants secured to the said arms and arranged over the rear parts of the shears.

4. In a harvester, a supporting frame, links pivoted at their upper ends to the frame and free to rock longitudinally of it, levers pivoted between their ends to the lower end portions of the said links, non-revoluble blocks pivoted to the said levers, a pair of circular shears operatively connected with the said blocks, said shears being adjustable vertically by the said levers and blocks, and means for revolving the said shears.

5. In a harvester, a supporting frame, levers pivoted in the said frame, a pair of circular shears carried by the said levers and adjustable vertically, means for revolving the shears, a rock-shaft mounted crosswise of the frame, arms secured on the rock-shaft, adjustable links pivoted between the said arms and levers, and means for operating the rock-shaft provided with a retaining device for holding it in place.

6. In a harvester, a supporting frame, two vertically slidable shafts journaled in the frame, cutters secured on the shafts and forming a pair of shears, links pivoted at their upper ends to the frame, and free to rock longitudinally of it, levers pivoted between their ends to the lower end portions of the said links, blocks pivoted to the said levers and operatively connected with the said shafts and cutters, means for moving the levers pivotally to raise and lower the said shafts and cutters, and a plate for the lower ends of the cut plants to rest on supported from the two said blocks and arranged above the said cutters.

In testimony whereof I have affixed my signature.

H. O. SCRANTON.